US009071094B2

(12) United States Patent
Gasser et al.

(10) Patent No.: US 9,071,094 B2
(45) Date of Patent: Jun. 30, 2015

(54) SECURING DEVICE FOR USE IN AN ELECTRIC MACHINE (75) Inventors: Patrick Allen Gasser, Port Washington, WI (US); Wesley Kenneth Anderson, Cedarburg, WI (US)

(73) Assignee: Regal Beloit America, Inc., Beloit, WI (US)

(*) Notice: Subject to any disclaimer, the term of this patent is extended or adjusted under 35 U.S.C. 154(b) by 426 days.

(21) Appl. No.: 13/537,819

(22) Filed: Jun. 29, 2012

(65) Prior Publication Data
US 2014/0001903 A1    Jan. 2, 2014

(51) Int. Cl.
H02K 5/16    (2006.01)
(52) U.S. Cl.
CPC ........... *H02K 5/161* (2013.01); *Y10T 29/49696* (2015.01)
(58) Field of Classification Search
CPC ......... H02K 5/16; H02K 5/167; H02K 5/173; H02K 7/08
USPC ............... 310/90, 90.5, 89, 91; 384/247, 252, 384/253, 271
See application file for complete search history.

(56) References Cited

U.S. PATENT DOCUMENTS

| 989,775 | A | 4/1911 | Fraser |
|---|---|---|---|
| 1,394,418 | A | 10/1921 | Lant |
| 1,490,205 | A | 4/1924 | Chatto |
| 1,700,780 | A | 2/1929 | Tanner |
| 2,039,338 | A | 5/1936 | Nordquist |
| 2,164,837 | A | 7/1939 | Pfleger |
| 2,298,022 | A | 10/1942 | Ringland |
| 2,308,578 | A | 1/1943 | White |
| 2,556,489 | A | 6/1951 | Beeker |
| 2,650,992 | A | 9/1953 | Forss |
| 2,711,461 | A | 6/1955 | Reynold |
| 2,922,682 | A | 1/1960 | Abel |
| 3,165,006 | A | 1/1965 | Barrick |
| 3,952,814 | A | 4/1976 | Gelfand |
| 4,386,812 | A * | 6/1983 | Anderson ..................... 384/542 |
| 4,850,699 | A | 7/1989 | Rebordosa |
| 5,095,612 | A | 3/1992 | McAvena |
| 6,040,647 | A | 3/2000 | Brown |
| 6,345,928 | B2 | 2/2002 | Bratthall |
| 6,700,244 | B2 | 3/2004 | Hsu |

(Continued)

FOREIGN PATENT DOCUMENTS

| CA | 1285357 C | 7/1991 |
|---|---|---|
| CA | 2291707 C | 6/2003 |

(Continued)

*Primary Examiner* — Michael Andrews
(74) *Attorney, Agent, or Firm* — John Wagley (57) ABSTRACT An electric machine includes a housing, a bearing and a securing device. The housing defines a bearing seat and a support surface. The bearing cooperates with the bearing seat and defines a bearing clamping surface. The securing device is connected to the housing and includes a fastener and a member defining a member clamping surface. The member and the fastener secure the bearing to the housing. The securing device has a first position for assembly of the bearing into the bearing seat and a second position for constraining the bearing in the housing. The member clamping surface overlies the bearing clamping surface when the member is in the second position. The member provides continuous movement from the first position to the second position. The support surface engages the member when the member is in the second position.

15 Claims, 8 Drawing Sheets

(56) References Cited

U.S. PATENT DOCUMENTS

| | | |
|---|---|---|
| 6,752,249 B1 | 6/2004 | Jungbecker |
| 7,992,662 B2 | 8/2011 | King |
| 8,061,902 B2 | 11/2011 | Wirthmann |
| 2001/0048844 A1 | 12/2001 | Bratthall |
| 2001/0050483 A1 | 12/2001 | Hanisch |
| 2003/0089195 A1* | 5/2003 | Neubauer et al. ............ 74/640 |
| 2003/0222532 A1 | 12/2003 | Hsu |
| 2005/0008502 A1 | 1/2005 | Manke |
| 2005/0029895 A1 | 2/2005 | Neidhart |
| 2005/0046292 A1* | 3/2005 | Campbell et al. ............ 310/90 |
| 2005/0239591 A1* | 10/2005 | Schoenek et al. ........... 474/144 |
| 2007/0080593 A1 | 4/2007 | O'Donnell |
| 2007/0175681 A1 | 8/2007 | King |
| 2008/0292232 A1 | 11/2008 | Wirthmann |
| 2011/0120073 A1 | 5/2011 | Flanary |
| 2012/0019080 A1 | 1/2012 | Kottmyer |

FOREIGN PATENT DOCUMENTS

| | | |
|---|---|---|
| CA | 2339156 C | 4/2007 |
| DE | 3842223 A1 | 6/1990 |
| EP | 283642 B1 | 5/1993 |
| EP | 526596 B1 | 5/1995 |
| EP | 0569361 B1 | 2/1996 |
| EP | 1014538 A2 | 6/2000 |
| EP | 1014538 B1 | 3/2004 |
| EP | 1421279 B1 | 10/2006 |
| EP | 2410635 A2 | 1/2012 |
| FR | 2576160 A1 | 7/1986 |
| FR | 2639161 A1 | 5/1990 |
| GB | 204679 A | 7/1924 |
| GB | 592360 A | 9/1947 |
| GB | 745970 A | 3/1956 |
| GB | 970211 A | 9/1964 |
| GB | 1450909 A | 9/1976 |
| GB | 1498652 A | 1/1978 |
| GB | 1559705 A | 1/1980 |
| GB | 1559707 A | 1/1980 |
| GB | 1559708 A | 1/1980 |
| GB | 2322068 A | 8/1998 |
| WO | 9933158 A2 | 7/1999 |
| WO | 03019008 A1 | 3/2003 |
| WO | 2010135361 A1 | 11/2010 |

* cited by examiner

SECURING DEVICE FOR USE IN AN ELECTRIC MACHINE

BACKGROUND OF THE INVENTION

The embodiments described herein relate generally to an electric machine, and more specifically, to a securing device associated with the electric machine.

An electric machine is typically in the form of an electric generator or an electric motor. The machine typically has a centrally located shaft that rotates relative to the machine. Electrical energy applied to coils within the motor initiates this relative motion which transfers the power to the shaft and, alternatively, mechanical energy from the relative motion of the generator excites electrical energy into the coils. For expediency the machine will be described hereinafter as a motor. It should be appreciated that a motor may operate as a generator and vice versa.

The shaft is supported within the motor by a bearing. The bearing is typically a separate component that is removeably secured to the motor. The bearing is typically secured to a housing of the motor to which other components of the motor are secured. The housing may be in the form of a plurality of components including an end portion, generally known as a motor end bell.

The bearing is typically secured in the housing or end bell by a fit to a bore within the end bell, a shoulder formed in the end bell and a securing device opposed to the shoulder. To permit assembly, the securing device includes an open bearing loading position and a closed bearing securing position. Such securing devices typically include fasteners, for example, a pair of opposed studs extending from the housing and a matched pair of protrusions or tabs that are rotatably secured to the studs, providing a first position in which they provide the bearing loading position and a second position in which they provide the bearing securing position. As the tabs rotate they must first pass the end face of the end bell and then the end face of the bearing.

Housings and housing components, including end bells are typically cast with the features as cast having dimensions that vary widely between castings. These wide variations in the as cast end face of the end bell make its location relative to the bearing end face vary widely, causing some assemblies to have the face of the end bell extend beyond the end face of the bearing, while other assemblies have the opposite relationship. These wide variations in dimensions may cause the tabs to interfere with end face of the end bell, in which case they will not rotate completely into the bearing securing position, providing no or incomplete securing of the bearing to the end bell. Further, these wide variations in dimensions may cause the outside diameter of the bearing to extend excessively outward, in which case the tabs will contact the outside diameter of the bearing and not the end face of the bearing, not providing compete securing of the bearing to the end bell. Such issues require great attention be given when assembling these components.

BRIEF DESCRIPTION OF THE INVENTION

In one aspect, an electric machine is provided. The electric machine includes a housing defining a bearing seat and a support surface. The electric machine also includes a bearing cooperating with the bearing seat of the housing and defining a bearing clamping surface. The electric machine farther includes a securing device connected to the housing. The securing device includes a fastener and a member. The member defines a member clamping surface. The member and the fastener are adapted to secure the bearing to the housing. The securing device has a first position for assembly of the bearing into the bearing seat and a second position for constraining the bearing in the housing. The member clamping surface overlies the bearing clamping surface when the member is in the second position. The member is configured to provide continuous movement from the first position to the second position.

In another aspect, a securing device for an electric motor is provided. The securing device is adapted to secure a component to a motor housing having a component seat and a support surface. The securing device may be connected to the housing. The securing device includes a fastener and a member. The member and the fastener are adapted to secure the component to the housing. The securing device has a first position for assembly of the component into the component seat and a second position for constraining the component in the housing. The support surface engages the member when the member is in the second position. The member is configured to provide uninhibited motion for the first position to the second position.

In yet another aspect, a method for securing a bearing to an electric motor is provided. The method includes fabricating a bearing seat and a mounting face into a component. The method also includes securing a clamp to the mounting face and positioning the clamp in a first position. The method further includes installing the bearing into the hearing seat and positioning the clamp into a second position. The positioning the clamp in the second position includes advancing a surface of the clamp continually along the mounting face inwardly until it is in intimate contact with a face of the bearing.

DETAILED DESCRIPTION OF THE INVENTION

The methods, systems, and apparatus described herein facilitate securing a bearing to a housing within an electric machine. The bearing supports a shaft for rotation within the housing. To assist in securing the bearing to the housing, a securing feature may be used to apply pressure to an end face of the outer race of the bearing. Difficulties may occur in aligning components of the securing feature to the housing and the bearing. Precision machining of the components may alleviate difficulties with such aligning, but add costs to the electric machine.

The methods, systems, and apparatus described herein assist in the proper alignment of the respective components. The methods, systems, and apparatus described herein may also facilitate assembly speed and accuracy Furthermore, the methods, systems, and apparatus described herein reduce the need to provide components for the securing device having expensive precision machined surfaces for the securing the bearing to the housing.

Technical effects of the methods, systems, and apparatus described herein include at least one of improved quality, reduced material cost, and reduced labor costs.

Figure 3:
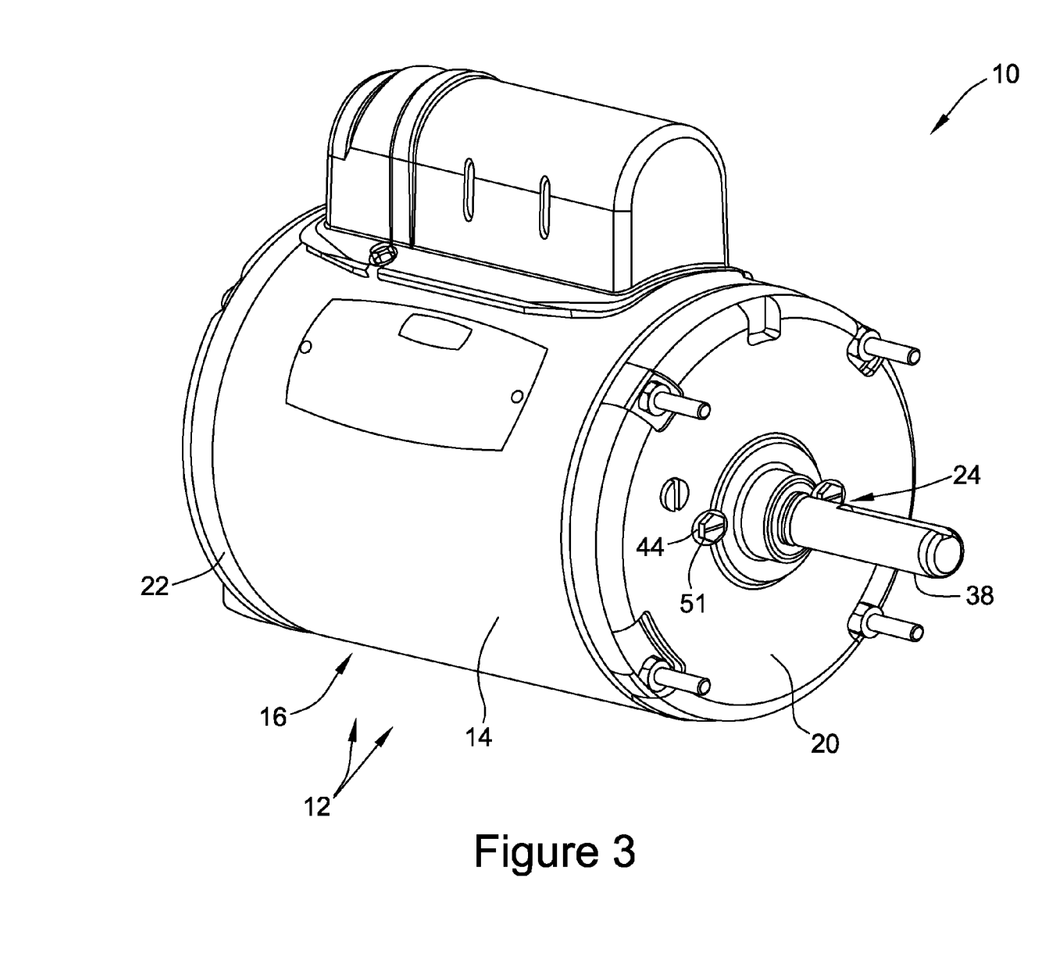
FIG. 3 is a perspective view of the end bell that includes the exemplary bearing securing device shown in FIG. 1 installed on an electric motor.

FIG. 3 is a perspective view of an exemplary electric motor 10. Although described herein as electric motor 10, the methods, systems, and apparatus described herein are also applicable to other electric machines, for example, electric generators. In the exemplary embodiment, electric motor 10 includes a motor housing 12 that defines an interior (not shown in FIG. 3) and an exterior 14 of motor 10. As shown in FIG. 3, the motor housing 12 includes a central portion 16 and opposed end portions 20 and 22, extending from the central portion 16. The central portion 16 is typically a hollow cylinder made from stamped steel, but other constructions such as polymers, reinforced polymers, and metals that may be molded, pressed or cast are anticipated. The end portions 20 and 22 may be molded, cast or machined and may be made of metals, polymers or composites. The end portions 20 and 22, if cast, may included surfaces that are later machined and others that remain as cast. Although described herein as having a motor housing with three portions, housings with fewer or more portions, are also applicable to the methods, systems, and apparatus described herein.

End portion 20 and 22 may be identical, may be similar or may have very different constructions. While end portion 20 is described in greater detail below, it should be appreciated that end portion 22 may have similar features and may utilize some or all of the features of the present invention. End portion 20 is also known as a bell cap, end shield, end frame, end bracket, or bracket.

In the exemplary embodiment, motor 10 includes a stationary assembly (not shown) fixed to housing 12 and a rotatable assembly 24, rotatably secured to housing 12. Typically the stationary assembly includes a stator (not shown) and the rotatable assembly includes a rotor (not shown). The stator and rotor typically include magnets and/or electric coils that, when subjected to electric currents produce the relative motion of the rotor with respect to the stator.

Figure 1:
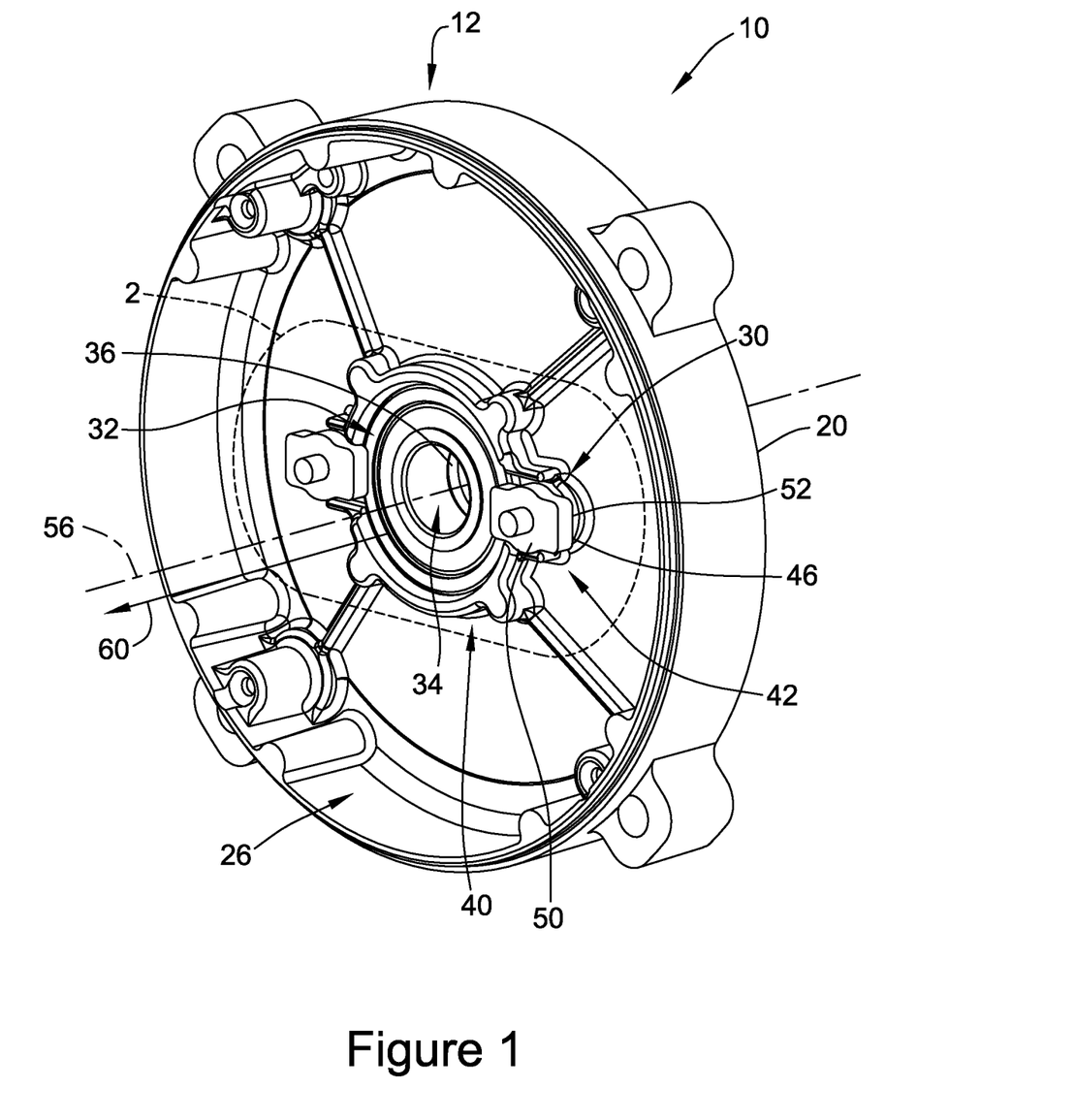
FIG. 1 is a perspective view of an end bell of an electric motor that includes an exemplary bearing securing device shown in the bearing engaging position.

Referring now to FIG. 1, a partial perspective view of bell cap 20 of the electric motor 10 is shown. The bell cap 20 shows a portion of interior 26 of motor 10. Motor housing 12 is configured to at least partially enclose and protect the stationary and rotatable assemblies. In the exemplary embodiment, the bell cap 20 of the electric motor 10 includes a support structure 30 for supporting the rotatable assembly 24. The support structure 30 typically includes bearing seat 32 defined by the bell cap 20. The bearing seat 32 may be defined by, for example, a bearing seat bore 34 formed in bell cap 20 of housing 12 and bearing seat face 36, also formed in the bell cap 20 of housing 12.

In the exemplary embodiment, the rotatable assembly 24 typically includes a shaft 38 (sec FIG. 3) on which the rotatable assembly 24 is supported. As shown in FIG. 1, a bearing 40 is typically used to support the shaft 38 of the rotatable assembly 24 within the housing 12.

Figure 2:
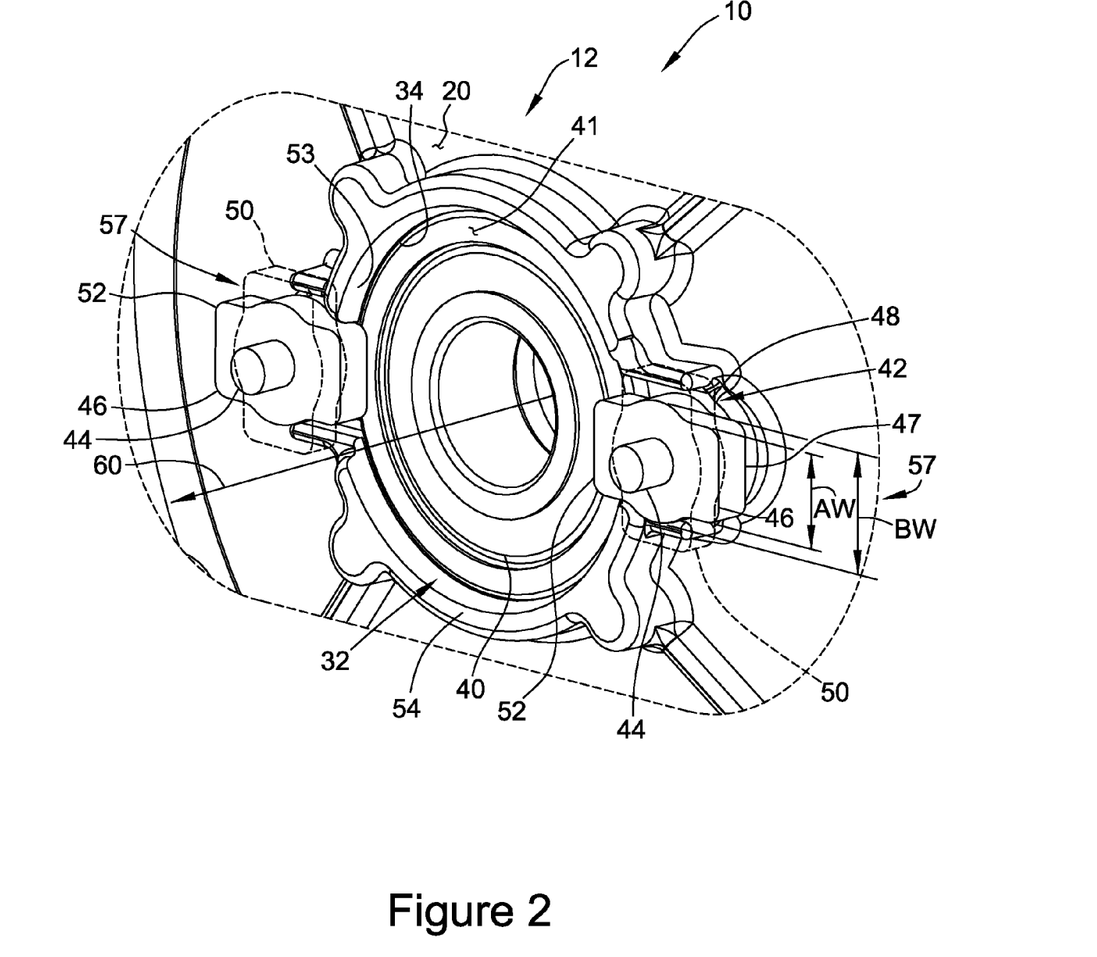
FIG. 2 is a partial perspective view of the end bell that includes the exemplary bearing securing device shown in FIG. 1.

Referring now to FIG. 2, the bearing 40 typically cooperates with the bearing seat 32 of the bell cap 20 of the housing 12 and may fit within bearing seat bore 34 and may be positioned against bearing seat face 36. The bearing 40 may be any bearing suitable for supporting the shaft 38. For example the bearing may be a sleeve bearing or a rolling element bearing and may be made from any of a variety of durable materials such as steel, brass, bronze, polymers or tin-babbot. A bearing with rolling elements, such as a ball bearing, is typical for this application.

Further, in the exemplary embodiment, a securing device 42 is connected to bell cap 20 of the housing 12. The securing device 42 includes a fastener 44 and a member 46. The member 46 and the fastener 44 are adapted to secure the bearing 40 to the housing 12. In the embodiment shown in FIG. 2, the securing device may also be known as a locked bearing tab with the member also known as a tab.

The fastener 44 may be any fastener capable of connecting the member 46 to the housing 12. For example, the fastener may be a rivet, clamp, weld or a threaded fastener and may include a head 51 (see FIG. 3) for cooperation with the housing. The fastener 44 may include a feature, such as flats or slots to assist in its rotation. The fastener 44 may be made of any suitable durable material, for example, a metal, a polymer or a composite material.

The member 46 may be have any suitable shape capable of cooperating with the fastener 44 and with the housing 12. The member 46 may be generally rectangular and may have an enlarged central region to accommodate the fastener. The member may include an opening for receiving the fastener 44 and the opening may be threaded to mate with threads on the fastener. Alternatively, the opening of the member may be generally cylindrical and the member may be made of more conformable material than the fastener, such that the fastener, when installed, forms or cuts threads in the member.

Figure 6:
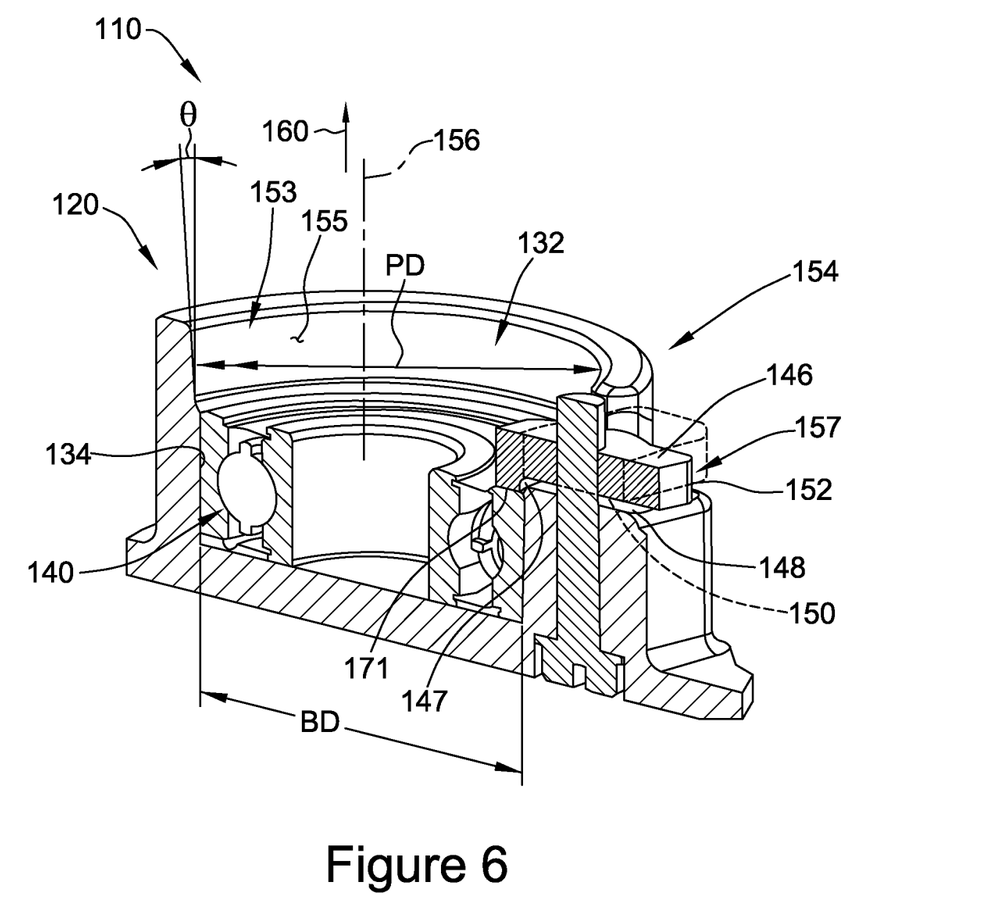
FIG. 6 is a perspective view of an end bell that includes an alternate exemplary embodiment of an exemplary bearing securing device with locking tabs having a raised portion.

Contact face 47 of the member 46 may have a flat configuration, for assisting in the smooth deployment of the member 46, or may include a raised portion, for assuring that other portions of the member are in clearance with the housing 12. Such a configuration of the member with a raised portion is shown in FIG. 6. The member may be made of any suitable durable material, for example, a metal, a polymer or a composite material.

As shown in FIG. 2, the securing device 42 is used to secure bearing 40 to bell cap 20. It should be appreciated that the securing device may, alternatively, be used to secure additional bearings to other portions of the housing 12. Further, the securing device may be used to secure other components to the housing, for example, motor controls or other mechanical or electrical components.

As shown in FIG. 2, the securing device 42 is connected to the housing 12 at lower or first support surface 48 of bell cap 20. The securing device 42 has a first position 50 (shown in phantom) for assembly of the bearing 38 into the bearing seat 32 and a second position 52 for constraining the bearing 40 in the housing 12.

While, as shown in FIG. 2, the motor 10 includes a pair of securing devices 42, it should be appreciated that the invention may be practiced with a solitary securing device or three or more such devices. The devices may be similar or, as shown, for simplicity and to reduce costs, may be identical. As shown, the devices 42 may be equally spaced about the bell cap 20, but may be otherwise positioned, to accommodate other components, for example. The discussion of the securing device shall apply to either or both of the devices 42, as shown.

Figure 4:
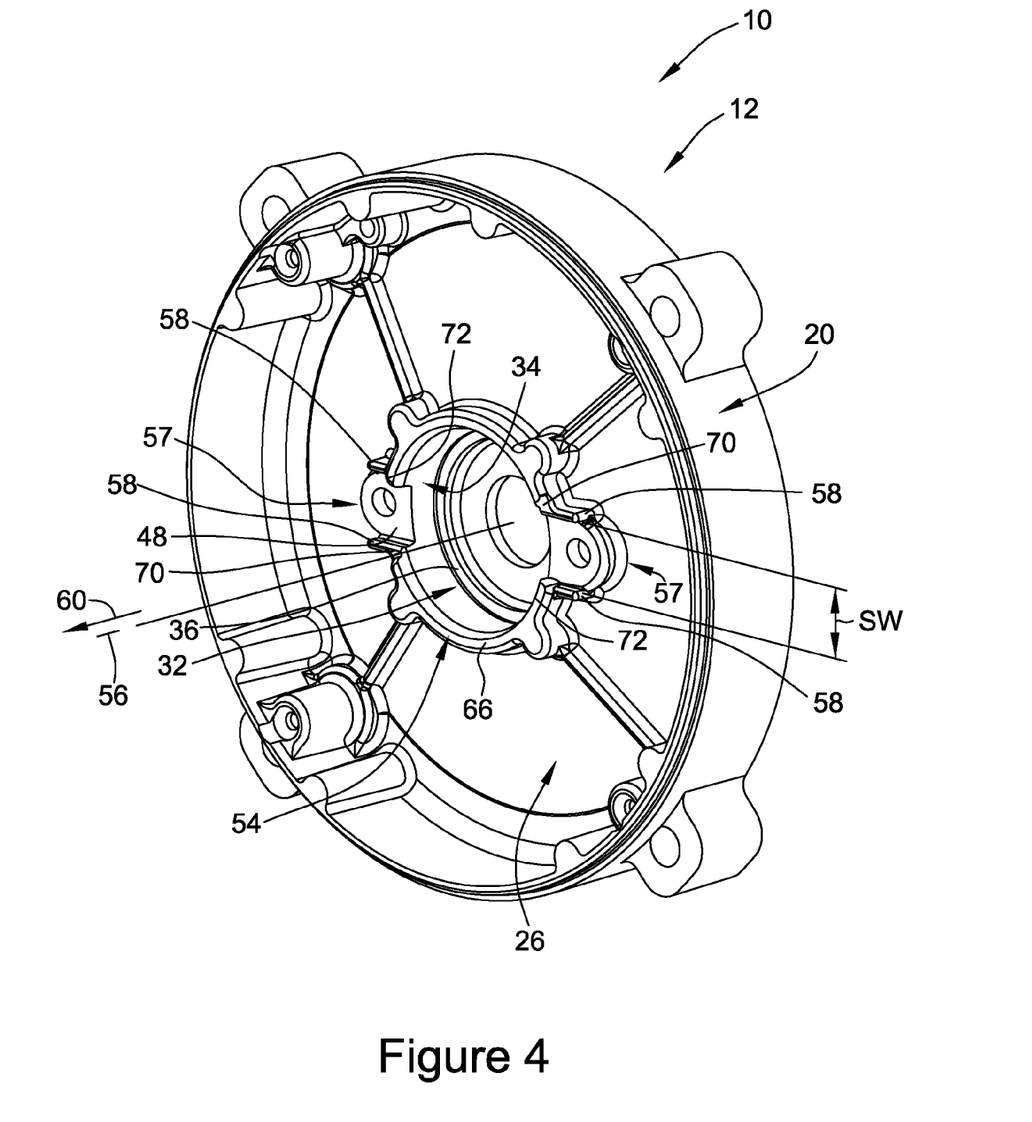
FIG. 4 is a perspective view of the end bell machined for receiving the exemplary bearing securing device shown in FIG. 1.

Referring now to FIG. 4, the end bell 22 of the housing 12 is shown with the securing device 42 and bearing 40 removed. As shown, the end bell 22 includes hub 54 extending outwardly from end bell 22 along bearing seat centerline 56. Seat 32 is positioned in hub 54 and includes bore 34 and face 36. As shown, the lower support surface 48 is positioned outwardly of bore 34 and extends radially inwardly toward the centerline 56 of the bearing seat 32.

Referring again to FIG. 2, the lower support surface 48 defines an opening or relief 57 in hub 54. The relief 57 serves to provide clearance between the hub 54 and the member 46 when the member 46 is in second position 52, engaging the securing face 41 of bearing 40.

The hub 54 may include a pilot portion 53 extending in the direction of arrow 60 from the bearing seat 32 for assisting in the assembly of the bearing 40 into the bearing seat 32. The shape of the pilot portion 53 may be configured to provide optimum guidance of the bearing. One such configuration is shown in FIG. 6 as pilot portion 153.

Referring again to FIG. 4, the lower support surface 48 is generally perpendicular to the centerline 56 and has a support surface width SW defined by a feature in the form of, for example, walls or rails 58 extending from surface 48 in the direction of arrow 60. The walls 58 may, as shown, extend radially outward from hub 54.

Figure 5:
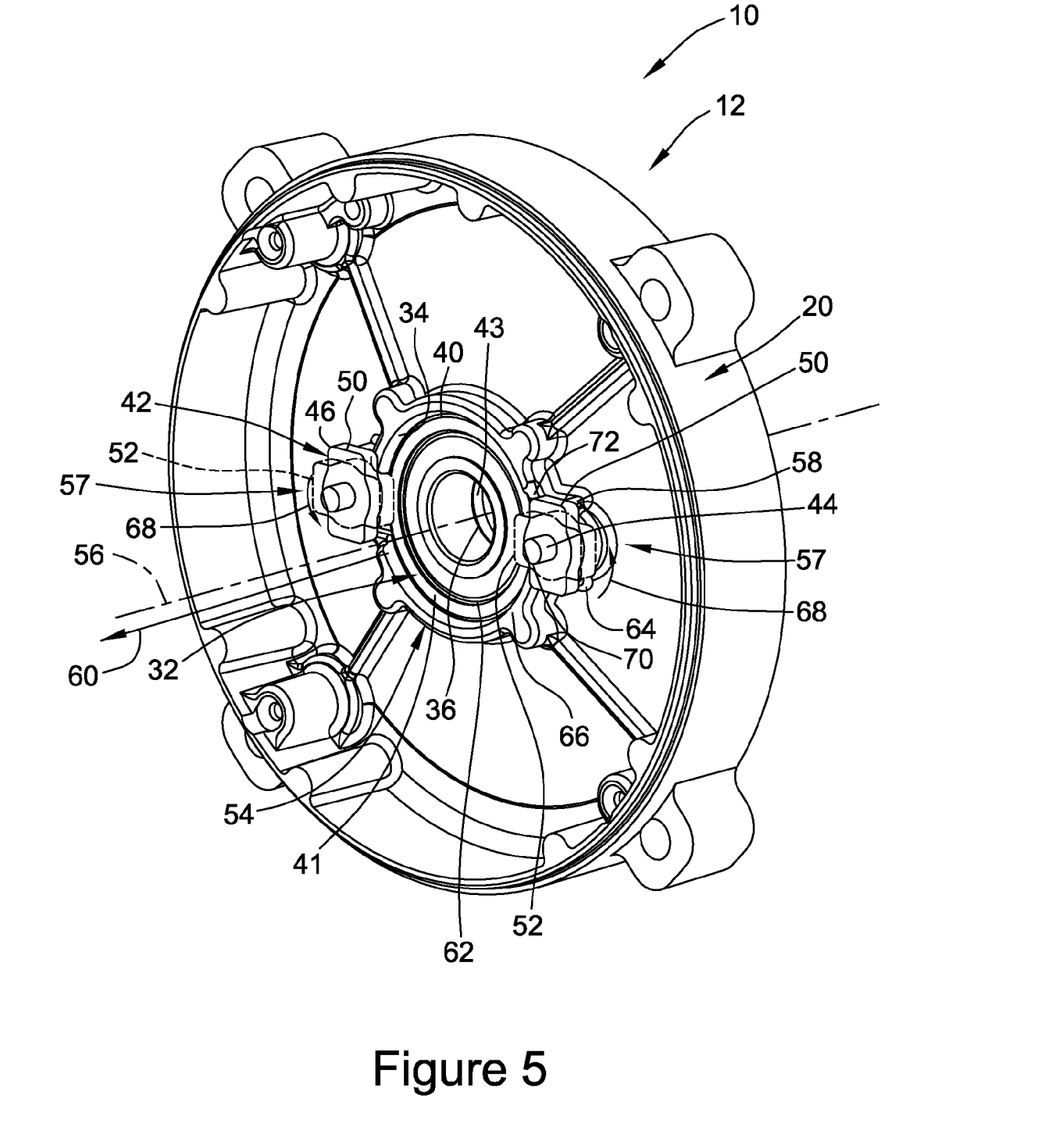
FIG. 5 is a perspective view of the end bell that includes the exemplary bearing securing device shown in FIG. 1 and shown in the bearing installing position.

Referring now to FIG. 5, the bearing 40 and the securing device 42 are shown installed onto the end bell 22. As shown, the bearing 40 has an outer periphery 62 which mates with bore 34. The bearing 40 is assembled by advancing it along centerline 56 into seat 32 in a direction opposed to that of arrow 60. The bearing 40 is advanced until seating face 43 of bearing 40 seats against face 36 of seat 32.

The securing device 42 is used to secure the bearing 40 in seat 32 of end bell 22. The securing device is positioned in first position 50 so that the bearing 40 may be freely advanced along centerline 56 into seat 32. Various assembly techniques are contemplated including preassembling the bearing 40 into the end bell 22 and, subsequently, assembling the end bell 22 onto the central portion 16 of the housing 14, while passing the shaft 36 through the bearing 40. In an alternative assembly technique, the bearing 40 may be preassembled to the rotatable assembly 24 and then the end bell 22 may be assembled to the central portion 16 of the housing 14, aligning the bore 34 of seat 32 of end bell 22 to the periphery 62 of bearing 40. At least, when using the alternate assembly technique, the member 46 of the securing device 42 would be moved from first position 50 to second position 52 by rotating the fasteners 44 from outside the motor 10 in the direction of arrow 68.

Preferably, and as show in FIG. 5, when the member 46 is in first position 50, the member 46 is located in the direction of arrow 60 front face 41 of bearing 40 and in the direction of arrow 60 from hub 54. When in this position, the member 46 may be rotated into second position 52 (shown in phantom) without being first stopped by hub 54 or by bearing 40.

Preferably, a guide/positioning feature is provided to so locate the member 46. In the embodiment shown in FIG. 5, the guide/positioning features are in the form of the walls 58 which cooperate with members 46. The members 46, when in the first position 50, rest against second or upper support surface or face 64 of walls 58.

Figure 7:
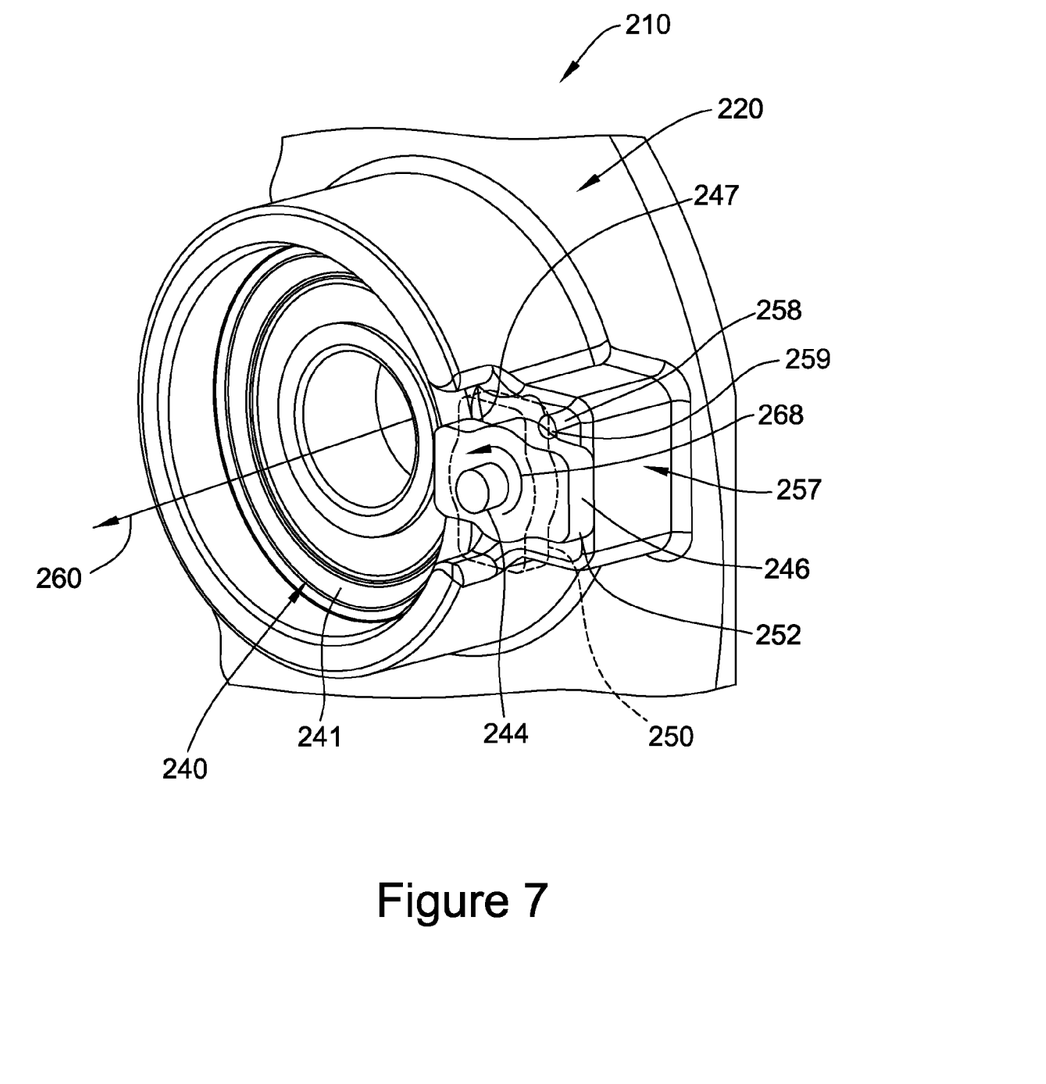
FIG. 7 is a perspective view of an end bell that includes another alternate exemplary embodiment of an exemplary bearing securing device with stops for limiting rotation of the tabs.

Preferably, and as shown in FIG. 5, at least the portion of the face 64 on which the members 46 are positioned is spaced in the direction of arrow 60 from face 41 of bearing 40 and at least the portion of the face 66 of hub which will be in alignment with the member 46 as it rotates in direction of arrows 68 is spaced in the direction of arrow 60 from face 66 of hub 54. This relative position of the member 46 with respect to the faces 41 and 64 permits the members 46 to be rotated continually, unimpededly, uninhibitedly and unobstructedly in the direction of arrows 68 as they move from the first position 50 (shown in solid) to the second position 52 (shown in phantom). It should be appreciated that the guide/positioning feature may be in the form of any feature, for example, in the form of a protrusion such as a pin, a knob, or a plate or, as shown in FIG. 5, in the form of walls 58 that may form a smooth ramp for the member 56 from the first position to the second position, guiding the member over the face 66 of hub 54. An embodiment using pins as guide/positioning features is shown in FIG. 7.

Referring again to FIG. 2, the relief 57 is configured for receiving the member 46 when in second. position 52. As shown, the member 46 has a body width BW and an arm width AW which both are less than the slot width SW. As shown, when in second position 52, the member contact face 47 of member 46 may contact lower surface 48 of relief 57.

Referring again to FIGS. 4 and 5, the rotation of the members in the direction of arrows 68 may be limited by at least one of several alternative rotation limiting features. These limiting features serve to limit further rotation of the members 46 once the members 46 are advanced to second position 52 during assembly. For example and as shown in FIG. 5, the hub 54 may serve as such a limiting feature. As shown, the face 66 of hub 54 may include higher portions 70 and lower portions 72, such that the members 46 may pass by the lower portions 72 when the member is advanced from first position 50 to second position 52 and may be stopped by higher portions 70 if further motion in direction of arrows 68 is attempted. The higher portions 70, as shown in FIG. 5, may be the result of, for example, either a step or a cam or spiraling outward of face 66 of hub 54 in direction of arrow 60 from the reliefs 57 as the face 66 of hub 54 advances in the direction of arrow 68. Alternatively, a protrusion (not shown) may be positioned on face 66 of hub 54 at higher portions 70. Alternatively, the rotation limiting features may be pins, knobs, or other protrusions. An embodiment using pins is shown in FIG. 7.

As shown in FIG. 2, when the fastener 44 is in the form of a threaded fastener with right hand threads, the members 46 are advanced from first position 50 to second position 52 by rotating the fasteners 44 in the direction of arrows 68. Prevailing torque between the members 46 and the fasteners 44 causes the members 46 to rotate in the direction of arrows 68 when the fasteners are so rotated. The prevailing torque can be provided in numerous ways. For example, friction between the threads in the fasteners 44 and those in the members 46 may provide the prevailing torque. Alternatively, the friction resulting from using the fasteners to form or cut the threads in the member may provide the prevailing torque. Alternatively, a material may be positioned between the member and fastener to provide the friction required to obtain the prevailing torque. Once the rotation limiting features, for example, higher portions 70, stop the rotation of the members 46, the further rotation of the fasteners 44 in the direction of arrows causes the members 46 to advance toward the face 41 of bearing 40 securing the bearing 40 properly in the bearing seat 32. Thus, the members 46 and the fasteners 44 provide continuous and unimpeded movement of the members 46 from the first position 50 to the second position 52.

Referring now to FIG. 6, another embodiment of the present invention is shown as motor 110. The motor 110 is similar to motor 10 of FIGS. 1-5, except motor 110 includes guide/position features and rotation limiting features that are different than those of the embodiment of FIGS. 1-5 and a pilot portion 153 that is different than pilot portion 53 of the embodiment of FIGS. 1-5.

As shown in FIG. 6, the motor 110 includes a bell cap 120 generally similar to bell cap 20 and includes a hub 154 different from hub 54. The hub 154 includes a pilot portion 153 extending in the direction of arrow 160 from the bearing seat 132 for assisting in the assembly of bearing 140 into the bearing seat 132. The pilot portion 153 includes an inner periphery 155 that is configured to provide optimum guidance of bearing 140. The inner periphery 155 may have an inner periphery diameter PD that may be slightly larger than bearing bore diameter BD of bearing bore 134. For example the inner periphery diameter PD may be the same to 0.030 inches larger or more than bearing bore diameter BD at its smallest location along centerline 156 and may taper outwardly an angle Θ of from 0 to 15 or more degrees from the smallest location. The taper may extend, for example, for an axial distance of from 0.050 inches to a distance the width of the bearing or more.

As shown in FIG. 6, the guide/position features and rotation limiting features may be provided in the form of relief 157 and member 146. The guide/position feature and rotation limiting features are provided by surface 148 of relief 157 and by member 146. The member 146 includes a protrusion 171 extending from member contact face 147. When in first or assembly position 150 (as shown in phantom), the protrusion 171 rests against surface 148 of relief 157. The relief 157 is large enough to permit the member 146 to spin freely into second position 152. At second position 152, the protrusion 171 interferes with hub 154, limiting further rotation of the member 146. Thus, the relief 157 and the protrusion 171 of the member 146 provide the guide/position feature and the rotation limiting feature.

Referring now to FIG. 7, another embodiment of the present invention is shown as motor 210 including end bell 220. In the exemplary embodiment, the guide/position features and rotation limiting features may be provided in the form of relief 257, pin 258 and member 246. The guide/position feature is provided by the relief 257, the member 246 and by surface 259 of pin 258. When in assembly position 250 (as shown in phantom) under surface 247 of member 246 rests against surface 259 of pin 258. The relief 257 is large enough to permit the member 246 to spin freely in the direction of arrow 268 from first position 250 (as shown in phantom) to second position 252 (as shown in solid) when the fastener 244 is rotated in the direction of arrow 268. At second position 252, the pin 258 interferes with member 246, thereby limiting further rotation of the member 246 in the direction of arrow 268. At this second position 252, further rotation of fastener 244 in the direction of arrow 268, causes the member 246 to move in a direction opposed to arrow 260, securing face 247 of the member 246 to surface 241 of bearing 240. Thus the relief 257, pin 258 and member 246 provide the guide/position features and the rotation limiting feature.

Alternatively, another embodiment of the present invention, not shown and similar to that of FIG. 7, includes a protrusion, in the form of, for example, a pin or post extending normally from a locking tab rotatably secured to a fastener to form a securing device. An end of the pin rests against a face of a recess formed in the end bell when in the first or assembly position placing the locking tab in an elevated position. When the fastener is rotated to assemble the securing device, as in the other embodiments, prevailing torque causes the locking tab to rotate to a second or constrained position. The locking tab is rotatably connected to the end bell and may rotate into the second or constrained position. In the second position, the pin will mate with an opening in the end bell extending inwardly from the face of the recess in the end bell. With the pin in the opening, the locking tab may be moved inwardly against the bearing, constraining the bearing. The opening may extend partially through the end bell or may extend completely through the end bell to the outside of the motor. The through hole would provide visual access to the pin, permitting a visual inspection to assure proper position of the locking tab for assembly from outside of the motor, the hole providing a view of the end of the pin. If sealing of the motor is desired, the hole could be plugged with a transparent material, for example, a polymer. The end of the pin could be viewed through the transparent plug from outside the motor.

Figure 8:
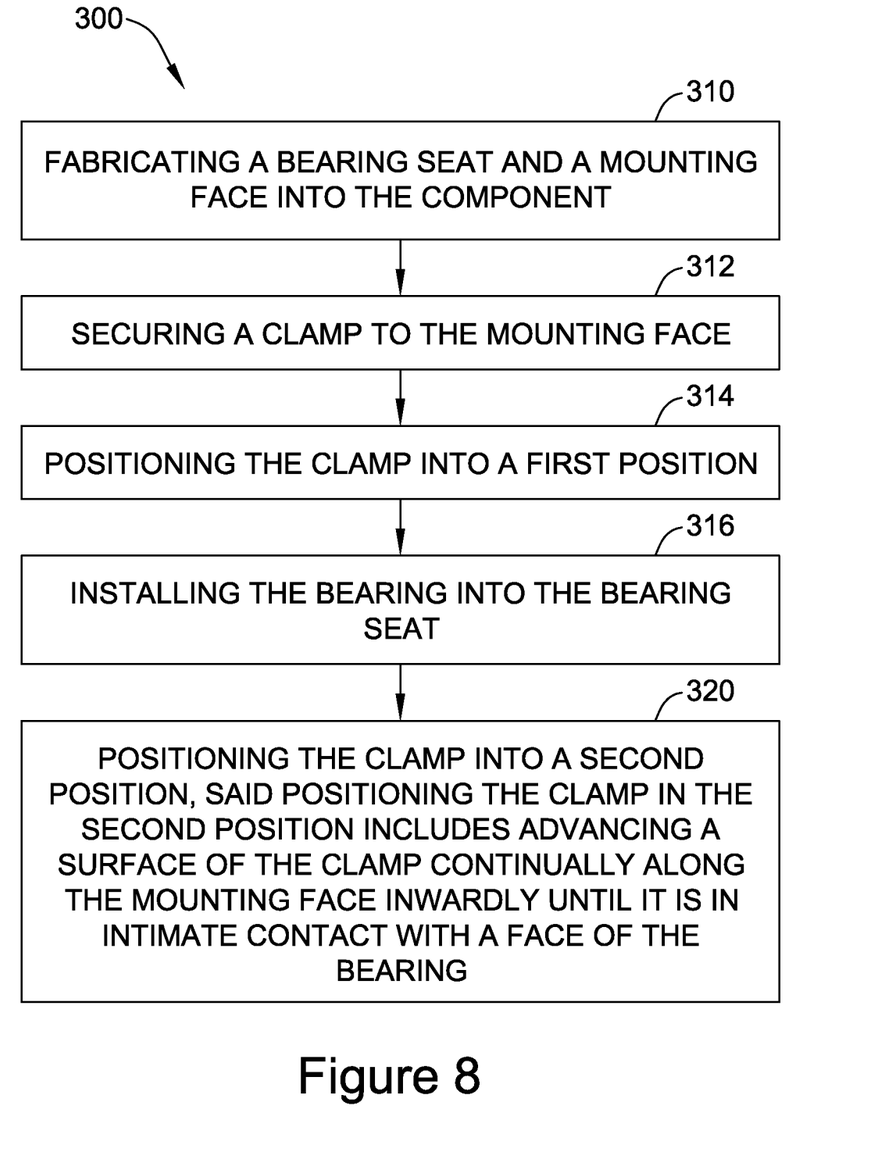
FIG. 8 is a flow chart of an exemplary method for assembling the electric motor shown in FIG. 1.

FIG. 8 is a flow chart of an exemplary method 300 for assembling an electric motor, for example, electric motor 10 (shown in FIG. 1). In the exemplary embodiment, method 300 includes securing device 42 for securing a bearing 40 to the electric motor 10.

The method 300 includes the step 310 of fabricating in any manner, for example by casting and/or by machining, a bearing seat 32 and a mounting face 48 into a component, for example, an end bell 22.

The method 300 also includes the step 312 of securing a clamp 42 to the mounting face 48.

The method 300 also includes the step 314 of positioning the clamp 42 in a first position 50.

The method 300 also includes the step 316 of installing the bearing 40 into the bearing seat 32;

The method 300 includes the step 320 of positioning the clamp 42 into a second position 52. The step of positioning the clamp 42 into the second position 52 includes advancing a surface 47 of said clamp 42, for example, continuously or without interference or impediment, along the mounting face 48 inwardly until it is in intimate contact with a face 41 of said bearing 40.

The method 300 may be provided such that the step 322 of positioning the claw 42 into the second position comprises rotating at least a portion of the clamp 42 with respect to the bearing seat 32.

The method 300 may be provided such that the step 314 of positioning the clamp 42 in a first position 50 includes providing the housing 12 with a second support surface 64, spaced from the first support surface 48. The second support surface 64 and the member 46 are adapted for engagement with each other when the member 46 is in the first position 50.

Described herein are exemplary methods, systems, and apparatus for assembling a motor and securing a component, for example, a motor, to a housing to form a motor. More specifically, the methods, systems, and apparatus described herein enable a securing device 42 to securely contain a bearing 40 to a housing 12, for example, a bell housing 20. The securing device 42 enables blind assembling of the bell housing 22 onto the motor 10. The securing device 42 reduces problems associated with a member, for example, the problem of a clamp member being improperly positioned. For example, the problem may be that the clamp is being caught by the bearing outside diameter or the hub and is not being properly positioned over the face of the bearing.

The methods, systems, and apparatus described herein facilitate efficient and economical assembly of an electric motor. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric machine, comprising;
a housing defining a bearing seat, having a bearing bore and a bearing support face, the bore defining a centerline thereof and said housing defining a first support surface and a second support surface, spaced from the first support surface in a direction along the centerline of the bearing bore;
a bearing cooperating with the bearing seat of said housing, said bearing defining a bearing clamping surface;
a securing device connected to said housing, said securing device comprising;
a fastener; and
a member, said member defining a member clamping surface, said member and said fastener adapted to secure said bearing to said housing, said securing device having a first position for assembly of said bearing into said bearing seat and a second position for constraining said bearing in said housing, wherein said member clamping surface overlies said bearing clamping surface when said member is in the second position, said member configured to provide continuous movement from the first position to the second position, said member in contact with the second support surface when said member is in the second position and said member in contact with the first support surface when said member is in the first position.

2. The electric machine in accordance with claim 1, wherein the support surface of said housing extends radially inwardly toward a centerline of the bearing seat.

3. The electric machine in accordance with claim 1, wherein said member is pivotally secured to said fastener.

4. The electric machine in accordance with claim 1, further comprising a stop for limiting movement of said member in a direction opposed to the first position when said member is in the second position.

5. The electric, machine in accordance with claim 1, wherein said housing comprises a generally cylindrical tubular portion thereof defining a bore for receiving an outer periphery of said bearing and a second portion thereof extending outwardly from the tubular portion for guiding the bearing into the bearing seat.

6. The electric machine in accordance with claim 1, wherein said member includes a body and a protrusion extending from said body and adapted for engagement with said housing, the protrusion defining a stop for limiting movement of said member.

7. The electric machine in accordance with claim 1, wherein at least one of said fastener and said member are adapted to provide prevailing torque therebetween to facilitate movement of said member from the first position to the second position upon movement of the fastener.

8. The electric machine in accordance with claim 1, wherein said member is configured to provide uninhibited rotational movement in a first direction from the first position to an intermediate position and uninhibited linear movement in a second direction from the intermediate position to the second position.

9. The electric machine in accordance with claim 1:
wherein said housing defines a bearing bore and a bearing support face, the bore defining a centerline thereof; and
wherein at least one of said member, said bearing and said housing are configured to provide for the positioning of said member clamping surface at a location spaced axially outwardly in the direction centerline from the bearing support face a distance greater than axial position of the bearing clamping surface in the direction centerline from the bearing support face continuously when said member is moved from the first position to the second position.

10. The electric machine in accordance with claim 1, wherein at least one of said bearing, said fastener, said housing and said member are adapted to permit said member to advance from the first position to the second position when said member is rotated in a first direction and to at least one of inhibiting said member from advancing from the first position to the second position when said member is rotated in a second direction, opposed to the first direction and inhibiting said member from rotating further in the first direction once said member has advanced from the first position to the second position.

11. The electric machine in accordance with claim 1, wherein at least one of said fastener, said housing and said member are adapted to cause said member to advance from the first position to the second position when said fastener is rotated.

12. The electric machine in accordance with claim 1, further comprising one of a pin, a stud, and a protrusion for limiting the rotational movement of said member.

13. A securing device for an electric motor, said securing device adapted for securing a component to the electric motor, said securing device comprising:
a motor housing having a component seat and a support surface thereof, said housing dining a component centerline thereof, said housing further defining a first support surface and a second support surface, spaced from the first support surface in a direction along the centerline of the component;
a fastener operably associated with said housing; and
a member, said member, said housing and said fastener adapted to secure the component to the motor, said member having a first position for assembly of the component into the component seat and a second position for constraining the component in the housing, the support surface engaging said member when said member is in the second position, wherein said member is configured to provide uninhibited movement from the first position to the second position, said member in contact with the second support surface when said member is in the second position and said member in contact with the first support surface when said member is in the first position.

14. The securing device in accordance with claim 13, wherein said member is pivotally secured to said fastener.

15. The securing device in accordance with claim 13, further comprising a stop for limiting movement of said member in a direction opposed to the first position when said member is in the second position.

\* \* \* \* \*